US012239222B2

(12) United States Patent
Schofield et al.

(10) Patent No.: US 12,239,222 B2
(45) Date of Patent: Mar. 4, 2025

(54) WEAPON LOCK

(71) Applicant: Law Enforcement Intelligent Devices, LLC, Auburn Hills, MI (US)

(72) Inventors: Mark Schofield, Grand Blanc, MI (US); Brad Grabow, Novi, MI (US)

(73) Assignee: Law Enforcement Intelligent Devices, LLC, Auburn Hills, MI (US)

( * ) Notice: Subject to any disclaimer, the term of this patent is extended or adjusted under 35 U.S.C. 154(b) by 0 days.

(21) Appl. No.: 18/485,689

(22) Filed: Oct. 12, 2023

(65) Prior Publication Data

US 2024/0041204 A1 Feb. 8, 2024

Related U.S. Application Data

(62) Division of application No. 16/949,725, filed on Nov. 12, 2020, now Pat. No. 11,819,126.

(60) Provisional application No. 62/934,134, filed on Nov. 12, 2019.

(51) Int. Cl.
*A47B 81/00* (2006.01)
*E05B 47/00* (2006.01)
*E05B 73/00* (2006.01)

(52) U.S. Cl.
CPC ............ *A47B 81/005* (2013.01); *E05B 47/00* (2013.01); *E05B 73/00* (2013.01)

(58) Field of Classification Search
CPC ........ A47B 81/005; E05B 47/00; E05B 73/00
USPC ............ 42/70.11; 292/137, 144, 207, 341.15
See application file for complete search history.

(56) References Cited

U.S. PATENT DOCUMENTS

| | | | |
|---|---|---|---|
| 2,316,995 | A | 4/1943 | Smith |
| 2,668,645 | A | 2/1954 | Pease |
| 3,917,071 | A | 11/1975 | Walters |
| 4,018,339 | A | 4/1977 | Pritz |
| 4,093,327 | A | 6/1978 | Linger |
| 4,132,315 | A | 1/1979 | Young |
| 4,174,042 | A | 11/1979 | Fair |
| 4,269,049 | A | 5/1981 | Henderson |
| 4,949,559 | A | 8/1990 | Glines |
| 5,454,931 | A | 10/1995 | Lauve |
| 5,979,846 | A | 11/1999 | Fluhr |
| 6,427,497 | B1 | 8/2002 | Mossberg, Jr. et al. |
| D554,252 | S | 10/2007 | Bucher et al. |
| 7,448,156 | B2 | 11/2008 | Tucich |
| 8,276,412 | B2 | 10/2012 | Ramsauer |
| 8,826,702 | B1 | 9/2014 | Barger |
| 8,950,596 | B2 | 2/2015 | Arabian et al. |
| 9,226,577 | B2 | 1/2016 | Stepp et al. |
| 9,708,835 | B2 | 7/2017 | Fisher |

(Continued)

*Primary Examiner* — James O Hansen
(74) *Attorney, Agent, or Firm* — Reising Ethington P.C.

(57) ABSTRACT

A weapon lock includes a latch pivotably coupled to a housing about a latch pivot axis, and includes a base arm, receiver and retainer arms extending transversely away from the base arm, and a pivot limit extension extending longitudinally away from the base arm. A weapon rack is configured to carry the weapon lock and includes upper and lower plates with upper and lower arrays of mounting apertures and pivotably coupled to one another via a hinge. A weapon cabinet is configured to carry the weapon rack and includes an enclosure having a rear wall to which a mounting backplane of the weapon rack is fastened with tamper-evident security fasteners, and having sidewalls, top and bottom walls, and doors hingedly coupled to the sidewalls.

15 Claims, 8 Drawing Sheets

(56) References Cited

U.S. PATENT DOCUMENTS

| | | | |
|---|---|---|---|
| 9,884,593 B2 | 2/2018 | Hull et al. | |
| 11,076,692 B2 * | 8/2021 | Canova | F16B 45/02 |
| 2002/0032976 A1 | 3/2002 | Riener | |
| 2005/0082241 A1 | 4/2005 | Lane et al. | |
| 2006/0027473 A1 * | 2/2006 | Taylor | A47B 81/005 42/70.11 |
| 2006/0048551 A1 | 3/2006 | Tanos | |
| 2006/0255699 A1 | 11/2006 | Punzel et al. | |
| 2007/0024165 A1 | 2/2007 | Moulton | |
| 2011/0074256 A1 | 3/2011 | Boice | |
| 2013/0002116 A1 | 1/2013 | Lodge | |
| 2013/0127316 A1 | 5/2013 | Wu | |
| 2014/0132131 A1 | 5/2014 | Thomas | |
| 2015/0332528 A1 | 11/2015 | McGinnis et al. | |
| 2017/0030114 A1 | 2/2017 | Fisher | |
| 2017/0336162 A1 * | 11/2017 | Plourde | F41A 17/06 |
| 2018/0094892 A1 | 4/2018 | Bowe et al. | |
| 2019/0093969 A1 * | 3/2019 | Pintar | A47B 81/005 |

* cited by examiner

WEAPON LOCK

CROSS-REFERENCE TO RELATED APPLICATIONS

This application is a divisional application of U.S. patent application Ser. No. 16/949,725 filed on Nov. 12, 2020, and now U.S. Pat. No. 11,819,126, which claims priority to provisional United States Patent Application No. 62/934,134, filed on Nov. 12, 2019. The contents of the aforementioned applications are incorporated herein by reference in their entireties.

TECHNICAL FIELD

This disclosure relates generally to equipment for securing weapons and, more particularly, to a weapon lock, rack, and cabinet.

BACKGROUND

A typical weapon cabinet includes a lockable enclosure, and some type of means to secure weapons in the enclosure, for example, stock rests, breech clamps, and barrel locks for long guns, and lockable drawers for handguns. Although weapon cabinets are essential for weapon safety, tracking, and the like, typical weapon cabinets have shortcomings. For example, many weapon cabinets are not easily rearranged for different weapon layouts, or are prone to tampering, or to damage to weapons or weapon accessories. Also, many weapon cabinets have cumbersome weapon locks that may frustrate users of such cabinets. And many weapon cabinets have designs that are excessively complex and/or costly.

BRIEF SUMMARY

In accordance with an embodiment of the present disclosure, a weapon lock includes a latch pivotably coupled to a housing about a latch pivot axis, and includes a base arm, receiver and retainer arms extending transversely away from the base arm, and a pivot limit extension extending longitudinally away from the base arm. In accordance with another embodiment of the present disclosure, a weapon rack is configured to carry the weapon lock and includes upper and lower plates with upper and lower arrays of mounting apertures and pivotably coupled to one another via a hinge. In accordance with an additional embodiment of the present disclosure, a weapon cabinet is configured to carry the weapon rack and includes an enclosure having a rear wall to which a mounting backplane of the weapon rack is fastened with tamper-evident security fasteners, and having sidewalls, top and bottom walls, and doors hingedly coupled to the sidewalls.

DETAILED DESCRIPTION

Figure 1:
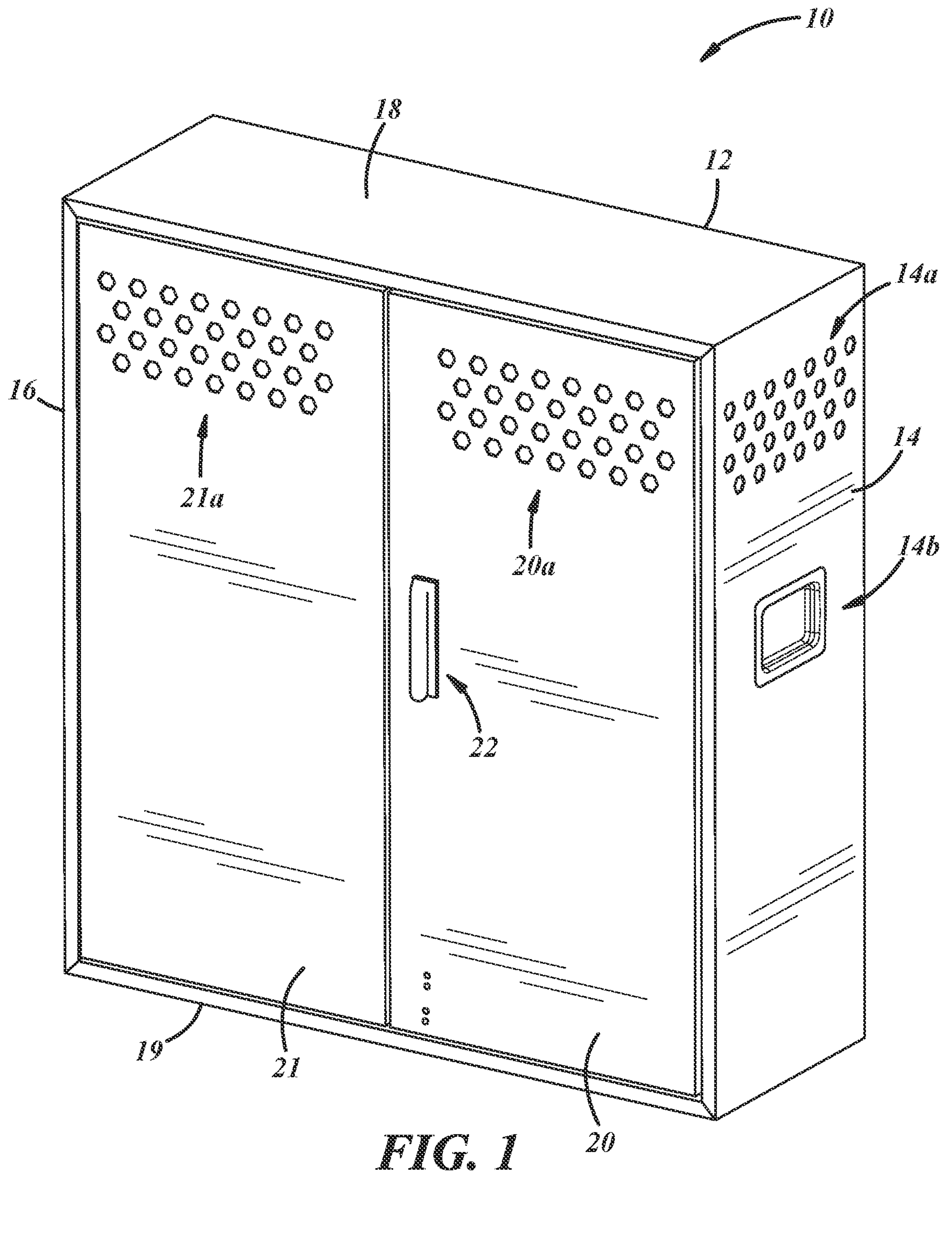
FIG. 1 is a perspective view according to an illustrative embodiment of a weapon cabinet in a closed and locked state.
Figure 2:
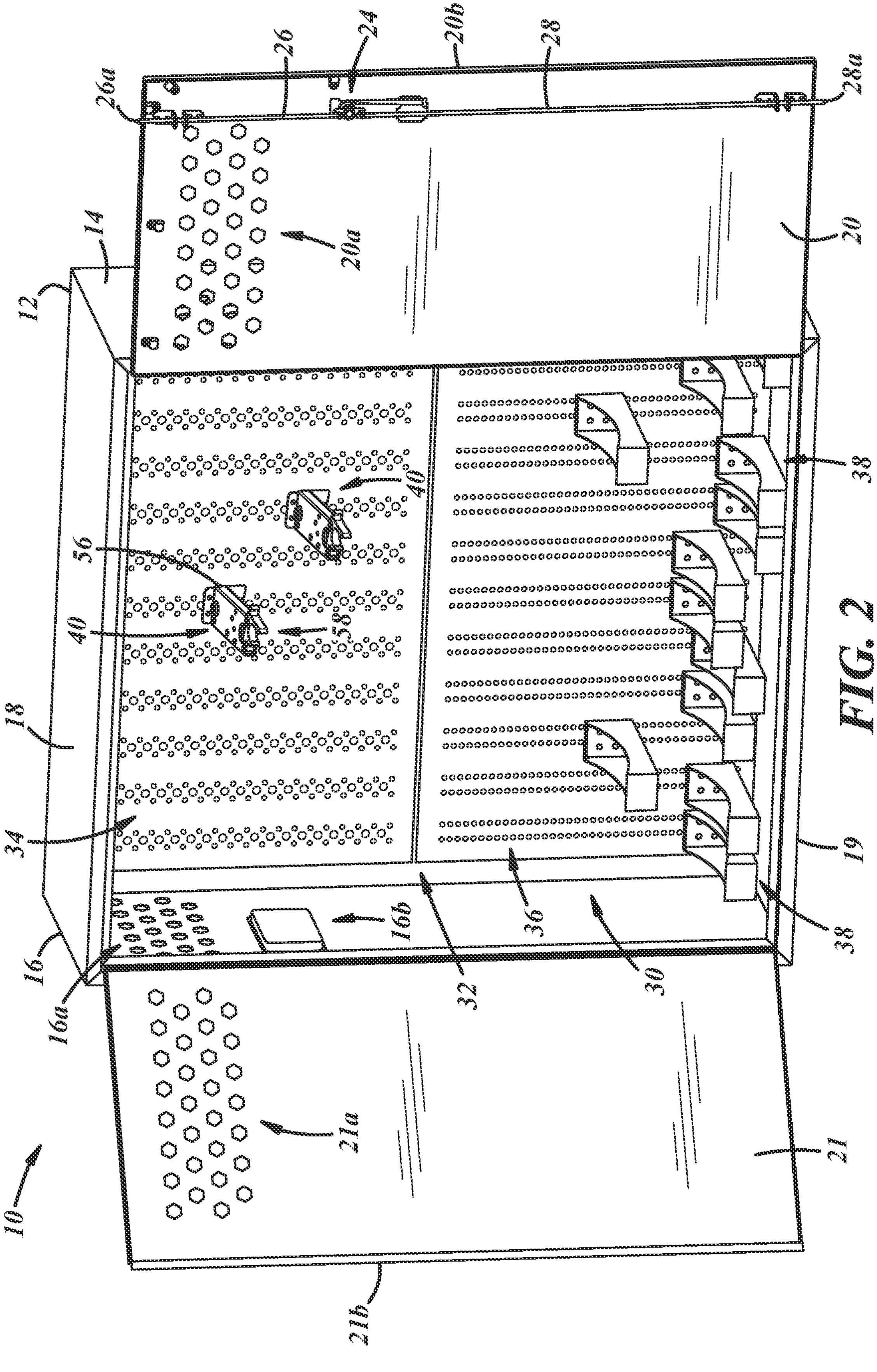
FIG. 2 is a perspective view of the weapon cabinet of FIG. 1 in an open state.

Referring specifically to the drawings, FIGS. 1 and 2 show an illustrative embodiment of a weapon cabinet 10 that includes an enclosure having a base wall or rear wall 12, sidewalls 14, 16 extending forward away from the rear wall 12, and top and bottom walls 18, 19 extending forward away from the rear wall 12. The weapon cabinet 10 also includes doors 20, 21 hinged to the sidewalls 14, 16, and being closeable and lockable to close and lock the cabinet 10, and being openable to provide access to an interior of the cabinet 10. The sidewalls 14, 16 and/or the doors 20, 21 may have arrays of viewing apertures 14*a*, 20*a*, 21*a* at upper portions thereof to permit some visibility into the interior of the cabinet 10 when the doors 20, 21 are closed. In contrast, the rear wall 12 preferably is continuous and does not have viewing apertures. Also, the sidewalls 14, 16 may include handles 14*b*, 16*b*, which may include recessed pocket handles that may be assembled and fixed to the sidewalls 14, 16, as illustrated. Accordingly, multiple cabinets may be stacked one atop another and/or located side-by-side flush against one another. The cabinet 10 may be composed of metal, for example, 18-gauge cold-rolled welded steel, or any other steel, or any other material suitable for use in securing weaponry. The cabinet 10 may be secured to a floor via the bottom wall 19 and/or to a wall via the rear wall 12.

With reference to FIG. 2, an inboard edge 21*b* of the left door 21 is configured to tuck under a corresponding inboard edge 20*b* of the right door 21 in a closed state. The right door 21 includes a lockable rotatable handle 22 pivotably fixed to a link 24 that is pivotably coupled to biaxial upper and lower throw rods 26, 28 having ends 26*a*, 28*a* configured to enter corresponding reliefs in the upper and lower walls 18, 19 to lock the doors 20, 21 to the rest of the cabinet 10. The handle 22 may be opened upon recognition of biometrics of a preauthorized user, for example, via iris and/or fingerprint readers. The handle 22 may be an H3-EM series electronic locking swing handle available from Southco, or any other electronic locking handle suitable for use with the enclosure.

The electronic locking handle 22 may be powered and controlled by a power supply and controller carried by the enclosure, or located in a biometrics access kiosk, or the like. Once a user logs on to a biometrics access system (e.g., assignee's BACS product) and selects an item that is in the cabinet 10, the electronic locking handle 22 is released such that the handle 22 can be rotated to open the doors 20, 21. Also, the handle 22 may be opened with a manual override key inserted into a lock of the handle 22.

With continued reference to FIG. 2, the cabinet also includes a weapon rack 30 that may be mounted to an inside surface of the rear wall 12 of the cabinet 10, for example, via mounting plate fasteners (not shown), which may include tamper-resistant security bolts/screws fasteners, or via welding, and/or via any other mounting method suitable for a weapon rack. The weapon rack 30 includes a mounting backplane 32, which includes two different aperture arrays including an upper aperture array 34 and a lower aperture array 36 that provide a plurality of discrete locating positions for other equipment of the weapon rack 30 described hereinafter. The weapon rack also includes a plurality of gun stock boots 38 coupled to the lower aperture array 36, and a plurality of electromechanical weapon locks 40 coupled to the upper aperture array 34. The weapon locks 40 may protrude away from the rack 30 for a distance greater than about five inches. In the illustrated embodiment, those of ordinary skill in the art will understand that more than ten long guns, and preferably twelve long guns, of varying lengths from about 11" to about 43" long, can be secured in the cabinet 10 via the vertically adjustable gun stock boots 38 and weapon locks 40. The cabinet 10 may be less than 46" tall, less than 44" wide, and less than 16" deep, and may weigh less than 110 pounds. Accordingly, the cabinet 10 provides an adjustable and modular weapon mounting arrangement with high storage density in a light and compact enclosure that is easily movable once unsecured from a floor and/or wall.

Figure 3:
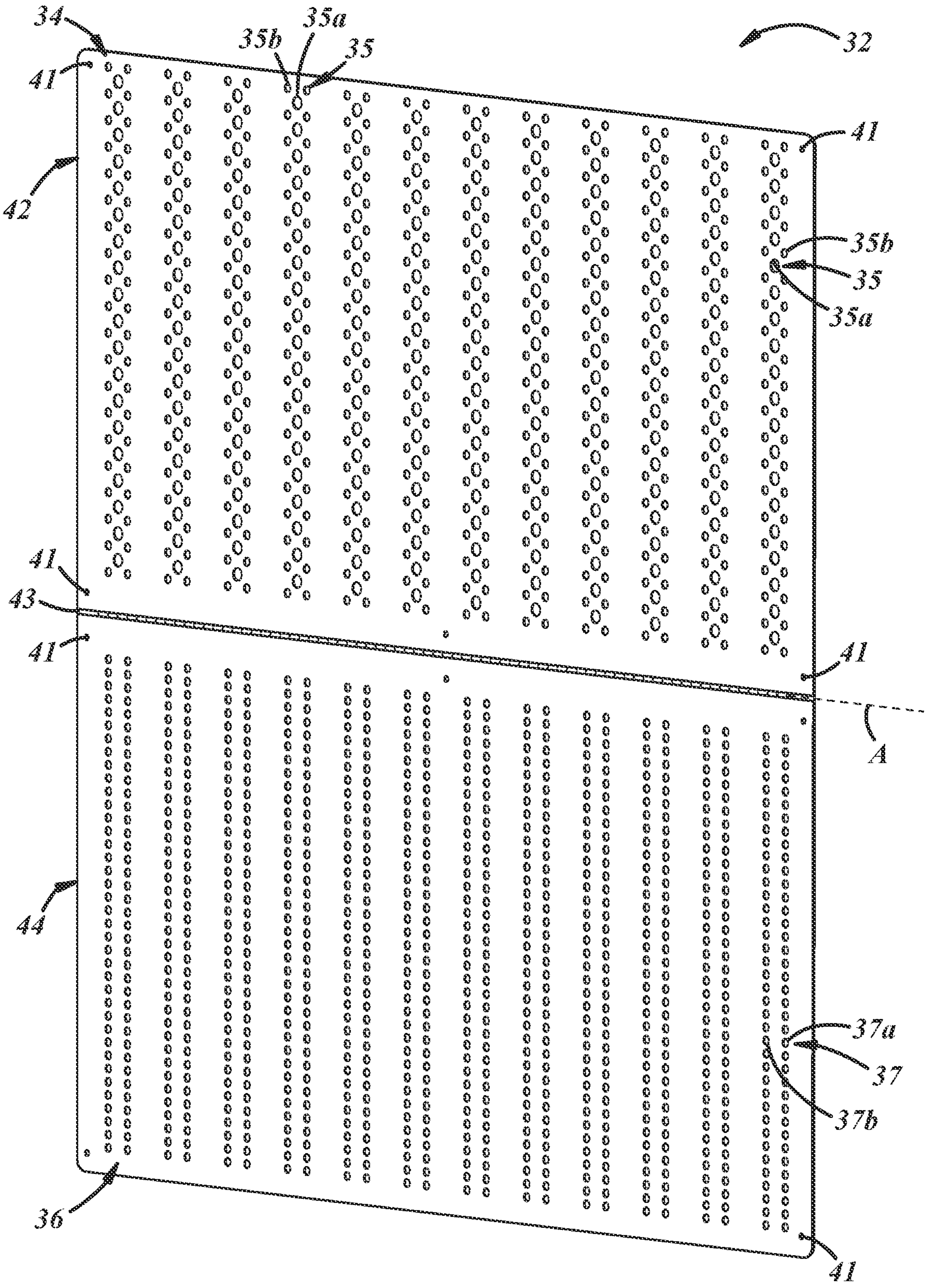
FIG. 3 is a perspective view of a mounting backplane of the weapon cabinet of FIGS. 1 and 2, including upper and lower mounting plates connected by a horizontally extending hinge.

As shown in the embodiment illustrated in FIG. 3, the mounting backplane 32 includes an upper mounting plate 42 and a lower mounting plate 44. The mounting backplane 32 may be spaced apart from the rear wall 12 of the enclosure to permit clearance for other fasteners used in securing the gun stock boots 38 (FIG. 2) and weapon locks 40 (FIG. 2) to the mounting backplane 32. The backplane 32 includes the upper and lower mounting plates 42, 44 pivotably coupled to one another via a hinge 43, which may be fixed to lower and upper margins of the upper and lower mounting plates 42, 44. The hinge 43 facilitates easy access to rear sides of the mounting plates 42, 44. For example, mounting plate fasteners for the upper mounting plate 42 can be removed to allow the upper mounting plate 42 to be pivoted downwardly about an axis A of the hinge 33 to permit access to weapon lock mounting fasteners (not shown) so that the weapon locks 40 can be unfastened, moved, and refastened. Thereafter, the reconfigured upper mounting plate 42 can be pivoted back to its upright positioned and refastened to the cabinet rear wall 12, for example, via fastener holes 41. Likewise, the mounting plate fasteners for the lower mounting plate 44 can be removed to allow the lower mounting plate 44 to be pivoted upwardly about the hinge axis A to permit access to stock boot mounting fasteners (not shown) so that the boots 38 can be unfastened, moved, and refastened. Thereafter, the reconfigured lower mounting plate 44 can be pivoted back to its vertical positioned and refastened to the cabinet rear wall 12.

With continued reference to FIG. 3, the upper aperture array 34 has multiple columns and rows of mounting and access aperture patterns 35 each including a larger central aperture 35*a* and four smaller surrounding mounting apertures 35*b*. The central aperture 35*a* may provide access to feed electrical wires therethrough. Each aperture pattern 35 is about one inch wide by one inch high across centerlines of the mounting apertures 35*b*, with a width and height distance from the centerline of the central aperture 35*a* to adjacent mounting apertures 35*b* being about half an inch. Each aperture pattern 35 shares mounting apertures with a vertically adjacent aperture pattern 35. Also, the lower aperture array 36 has multiple columns and rows of mounting aperture patterns 37 each including side-by-side pairs of mounting apertures 37*a*. Each side-by-side pair of mounting apertures 37*a* is spaced apart about an inch from centerline to centerline of adjacent apertures 37*a*. Each vertically adjacent pair of the mounting apertures 37*a* is spaced apart about half an inch from centerline to centerline of vertically adjacent apertures 37*a*. As used herein, the term "about" means within plus or minus ten percent.

Figure 4:
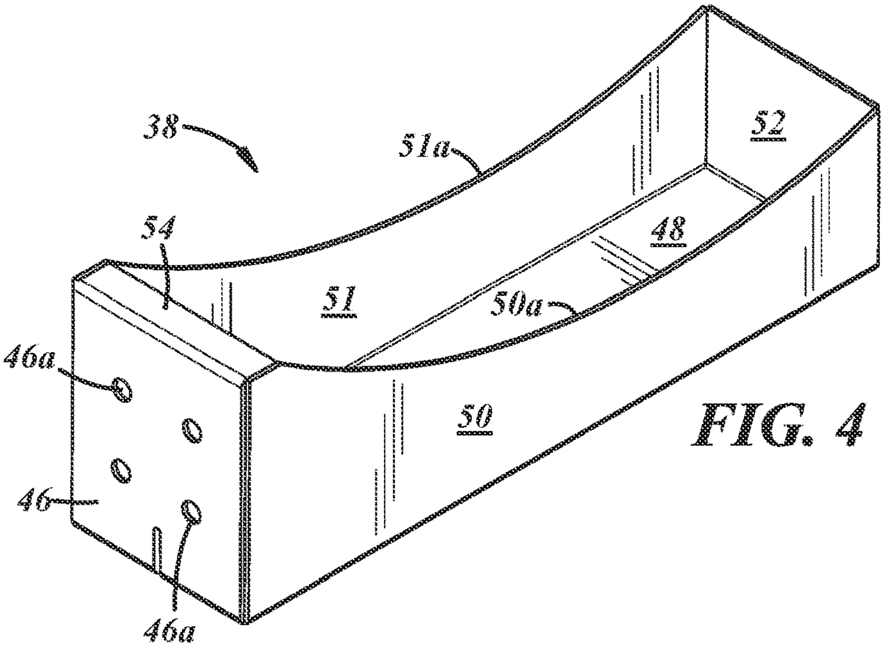
FIG. 4 is a perspective view of a gun stock boot of the weapon cabinet shown in FIG. 2.

With reference to FIG. 4, the illustrative gun stock boot 38 includes a base or rear wall 46 having mounting apertures 46*a* that correspond to the mounting aperture patterns 37*a* of the lower aperture array 36 of FIG. 3. The boot 38 also includes bottom walls 48 extending forward from the rear wall 46, sidewalls 50, 51 extending forward from the rear wall 46, a front wall 52 connecting the bottom and sidewalls, and a top lip 54 extending forward from the rear wall 46 and connecting the rear and sidewalls 46, 50, 51. The sidewalls 50, 51 have incurvate upper ends 50*a*, 51*a*. The front wall 52 is shorter than the rear wall 46. Accordingly, the boot design establishes a cup-like shape that will not let the weapon swing out the sides or the front of the boot 38.

Figure 5:
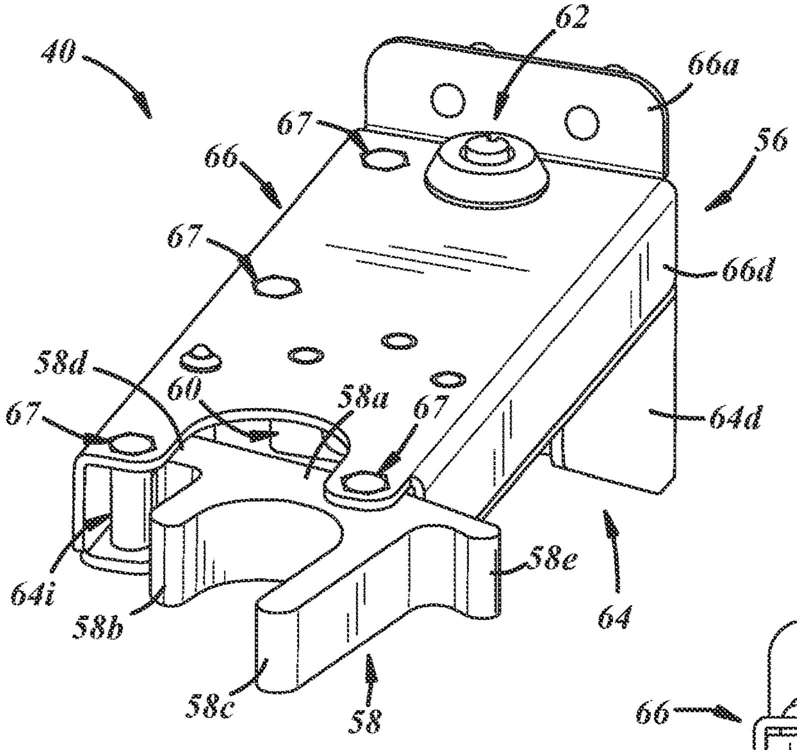
FIG. 5 is an upper perspective view of a weapon lock of the weapon cabinet of FIG. 2 and shown in a latch-open state.
Figure 8:
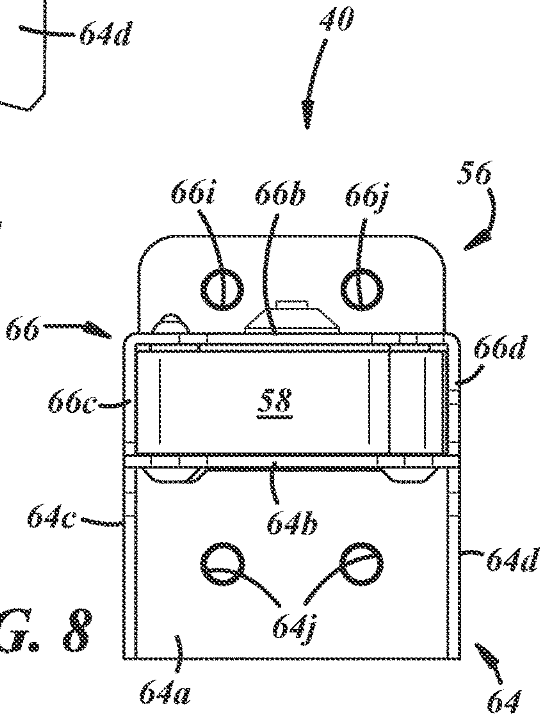
FIG. 8 is a front view of the weapon lock of FIG. 6.
Figure 9:
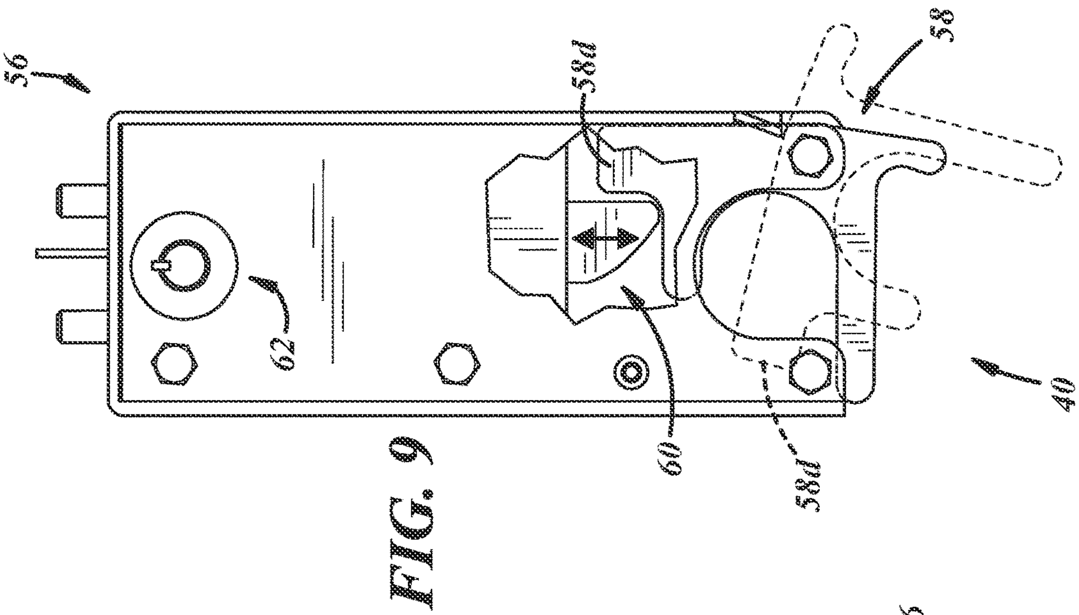
FIG. 9 is a top view of the weapon lock of FIG. 6.

With reference to FIG. 5, the weapon lock 40 generally includes a housing 56 for mounting the weapon lock 40 to the upper array 34 of the rack 30 as shown in FIG. 2 and for supporting other parts of the weapon lock 40. Also, the weapon lock 40 includes a latch 58 for receiving and locking a gun barrel (not shown) to the housing 56, an electromechanical slide bolt 60 to retain and release the latch 58, and a manual override lock 62 to manually actuate the electromechanical slide bolt 60 to release the latch 58.

Figure 6:
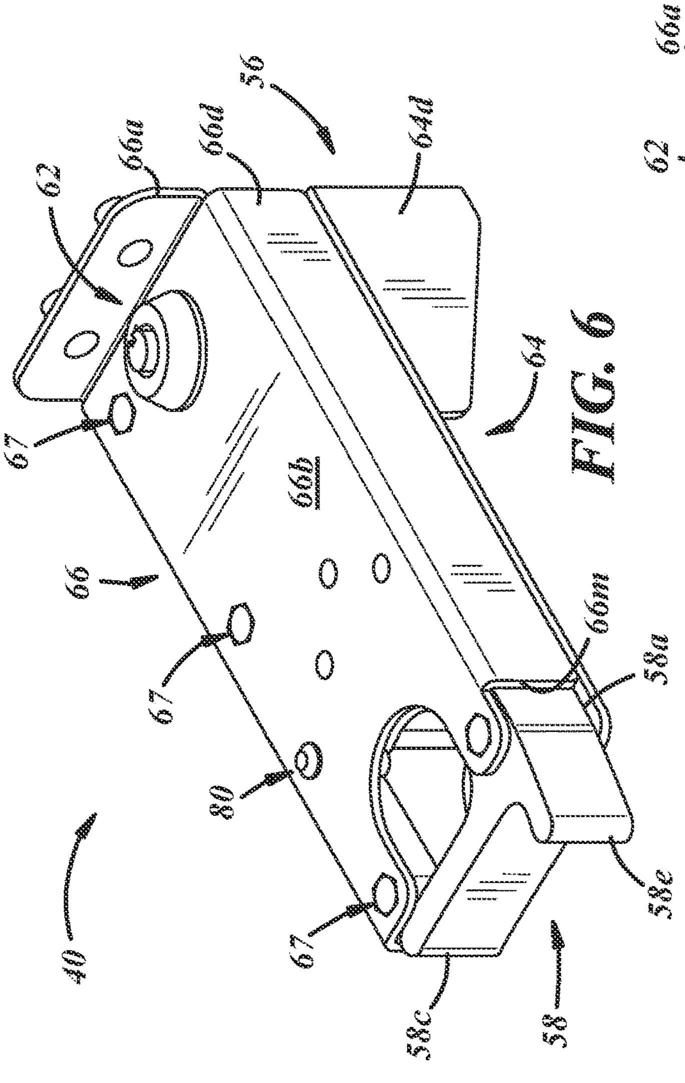
FIG. 6 is an upper perspective view of a weapon lock of the weapon cabinet of FIG. 2 and shown in a latch-closed state.
Figure 7:
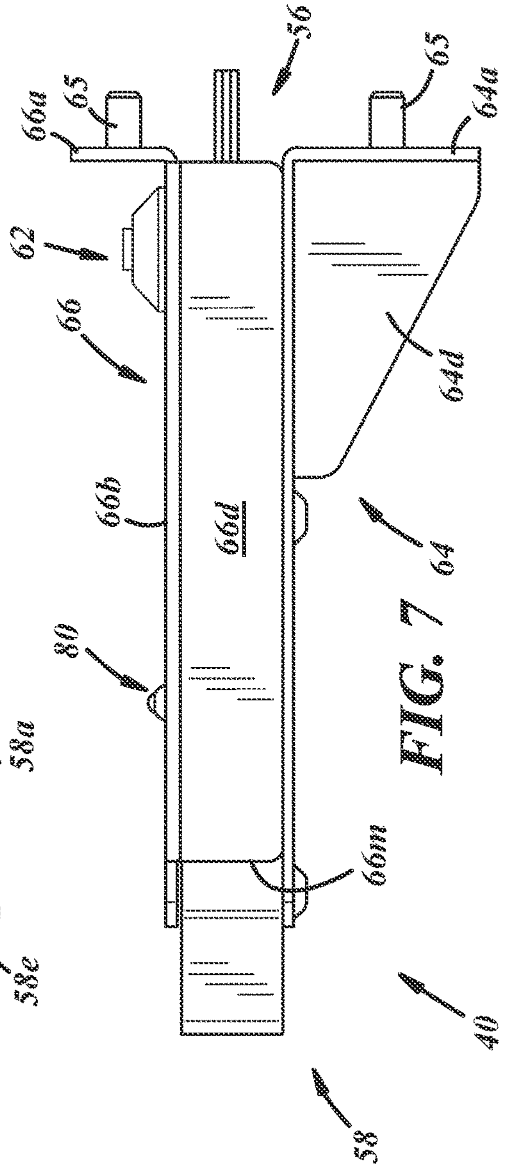
FIG. 7 is a side view of the weapon lock of FIG. 6.

With general reference to FIGS. 5-10, in the illustrated embodiment, the housing 56 includes a lower base 64 configured to be coupled to the rack 30 (FIG. 2) via one or more rack fasteners 65 (FIG. 7), and an upper cover 66 configured to be coupled to the rack 30 (FIG. 2) via one or more rack fasteners 65 (FIG. 7) and to the base 64 via several housing fasteners 67 (FIGS. 5-6). The lower base 64 and the upper cover 66 of the housing 56 may be constructed from sheet metal that may be coated with a protective coating to protect gun barrels. With specific reference to FIG. 10, the housing fasteners 67 may include internally threaded barrels 67*a* and externally threaded screws 67*b* for threaded engagement with the internally threaded barrels 67*a*. For example, the housing fasteners 67 may include PEM brand studs and/or standoffs from Penn Engineering. In other embodiments, the housing 56 need not be a two-piece assembly of the lower base 64 and the upper cover 66 and, instead could be constructed from a single piece, or more than two pieces.

Figure 10:
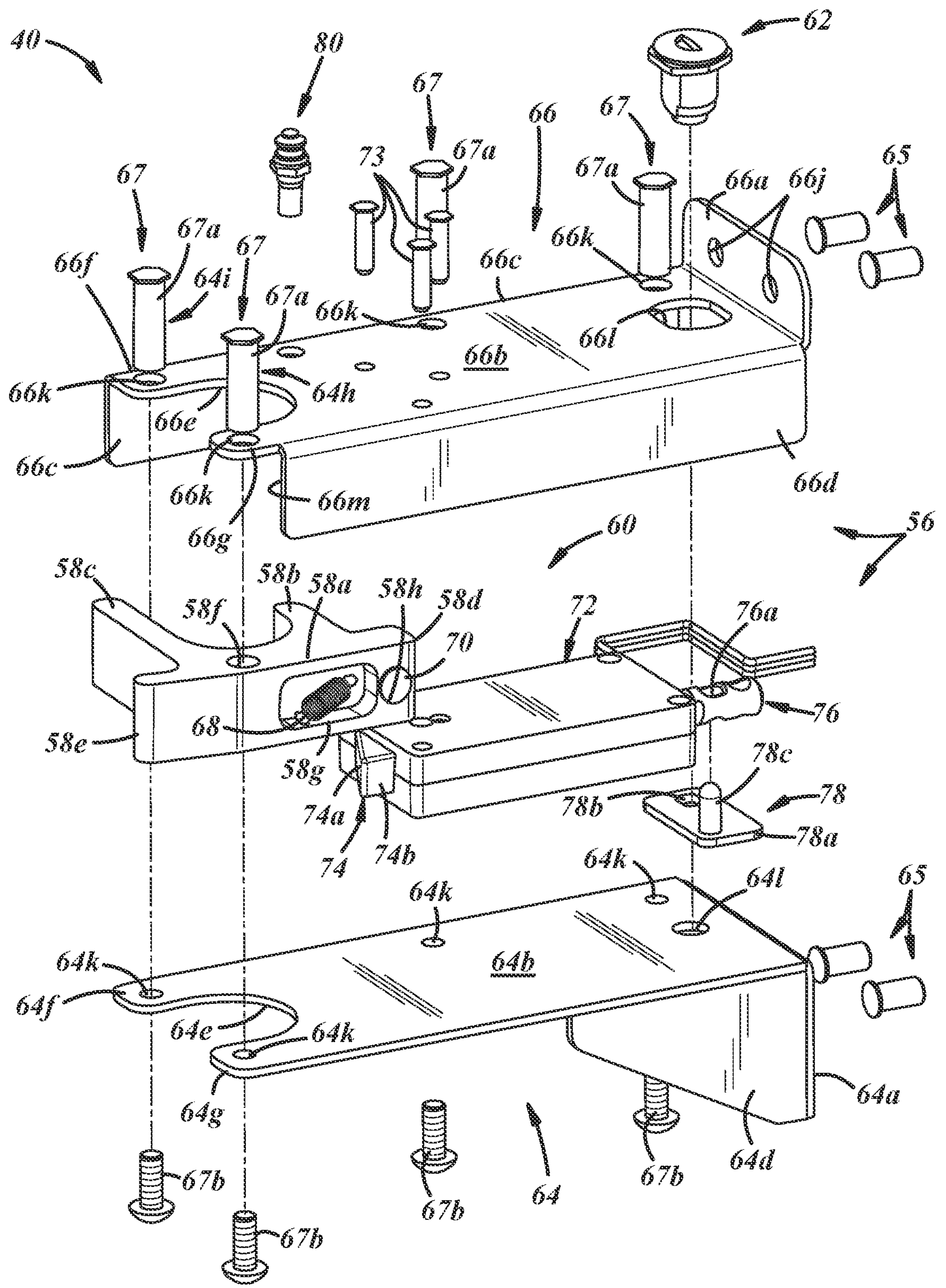
FIG. 10 is an exploded perspective view of the weapon lock of FIG. 6.

With general reference to FIG. 10, the lower base 64 includes a rear flange 64*a*, a lower wall 64*b* extending forward from the rear flange 64*a*, and one or more side reinforcements 64*c*, 64*d* extending between the rear flange 64*a* and the lower wall 64*b*. The lower wall 64*b* may have a scalloped front end including a lower scallop 64*e* to partially establish a weapon pocket and lower projections

64*f,g* on either side of the lower scallop 64*e* to provide support for a latch pivot 64*h* and a latch stop 64*i*. The lower projections 64*f,g* may have apertures therethrough for accepting corresponding portions of the latch pivot 64*h* and the latch stop 64*i*. The latch pivot 64*h* and the latch stop 64*i* may be established by the barrels 67*a* of the housing fasteners 67. The lower scallop 64*e* has a semi-circular edge and also may have straight edges extending from the semi-circular edge to the front end of the lower wall 64*b*. The rear flange 64*a* has one or more fastener apertures 64*j* therethrough for accepting the rack fasteners 65. Likewise, the lower wall 64*b* may have fastener holes 64*k* extending along one side of the lower wall including through one projection 64*f* and another fastener hole 64*k* through the other projection 64*g* across the scallop 64*e*. The lower wall 64*b* also may include an override lock mounting hole 64*l* proximate a rear end of the lower base 64 and laterally centered across the lower wall 64*b*.

The upper cover 66 includes a rear flange 66*a*, an upper wall 66*b* extending forward from the rear flange 66*a*, and sidewalls 66*c,d* depending downwardly from laterally opposite sides of the upper wall 66*b*. In the illustrated embodiment, together, the rear flanges 64*a*, 66*a* of the upper cover 66 and the lower base 64 may constitute a rear wall of the housing 56. Like the lower wall 64*b* of the lower base 64, the upper wall 66*b* has a scalloped front end including an upper scallop 66*e* to partially establish the weapon pocket and upper projections 66*f,g* on either side of the upper scallop 66*e* to provide support for the latch pivot 64*h* and the latch stop 64*i*. The upper scallop 66*e* may have a semi-circular edge and also may have straight edges extending from the semi-circular edges to the front end of the upper wall 66*b*. The rear flange 66*a* has one or more fastener apertures 66*j* therethrough for accepting the rack fasteners 65. The upper wall 66*b* has fastener holes 66*k* extending along one side of the upper wall 66*b* including through one projection 66*f* and another fastener hole 66*k* through the other projection 66*g* across the scallop 66*e*. The upper wall 66*b* also may include an override lock mounting hole 66*l* proximate a rear end of the upper cover 66 and laterally centered across the upper wall 66*b*.

A laterally outer width of the upper cover 66 across the sidewalls 66*c,d* corresponds to a laterally outer width of the lower base 64 across the lower wall 64*b*, such that lower ends of the sidewalls 66*c,d* are configured to rest on the lower wall 64*b*. One of the sidewalls 66*d* on the pivot side of the upper cover 66 has a recessed front end 66*m* that is spaced back from a front end of the pivot axis projection 66*j* to provide clearance for the latch 58. Also, with reference to FIG. 11, the recessed front end 66*m* of the pivot axis sidewall 66*d* is configured to provide an anchor 66*n* for attachment of a spring 68 to bias the latch 58 to a closed position of the 58 latch. In the illustrated embodiment, the anchor 66*n* includes a fastener extending through an end loop of the spring 68 and into the sidewall 66*d*. In another embodiment, the anchor 66*n* may include a portion of the sidewall 66*d* that is cut, and bent in an inboard direction, with respect to surrounding portions of the sidewall 66*d* to provide a post for an end loop of the spring 68. In other embodiments, the anchor 66*n* may include an aperture through the sidewall 66*d*, a free edge of the sidewall 66, or any other feature of the housing 56 suitable to serve as an anchor for the spring 68.

With reference again to FIG. 10, the weapon lock 40 also includes the latch 58 pivotably coupled to the housing 56 about the latch pivot 64*h* and between the lower base 64 and the upper cover 66. The latch 58 includes a base arm 58*a* extending along a base arm axis, and a receiver arm 58*b* extending transversely away from the base arm 58*a* and configured to cooperate with the base arm 58*a* to receive a gun barrel when advanced against the weapon lock 40. The latch 58 also includes a retainer arm 58*c* extending transversely away from the base arm 58*a* to partially establish the weapon pocket and configured to retain a gun barrel against withdrawal when the latch 58 is in a locked position with respect to the housing 56. The base wall 58*a* and the receiver and retainer arms 58*b*, 58*c* establish a J- or U-shaped channel having a semi-circular portion and straight portions extending away from the semi-circular portion. The latch 58 further includes a pivot limit extension 58*d* extending in a direction away from the base arm 58*a* to limit pivoting of the latch 58 beyond a desired gun barrel receiving position of the latch 58 that may be established by one of the housing fasteners acting as a latch stop. The pivot limit extension 58*d* may extend longitudinally away from a junction of the base wall 58*a* and receiver arm 58*b*, and may double as a lock bolt extension for cooperating with a lock bolt. The latch 58 additionally may include a finger extension 58*e* extending away from a junction of the base wall 58*a* and the retainer arm 58*c* and configured to aid a user in moving the latch 58 to a locked and/or an unlock position. In the illustrated embodiment, the base wall 58*a* of the latch 58 includes a pivot axis passage 58*f*, to accommodate passage of one of the housing fasteners therethrough at a pivot axis of the latch 58.

With continued reference to FIG. 10, the base wall 58*a* of the latch 58 may include a spring pocket 58*g* in an outboard surface and a magnet pocket 58*h* in the outboard surface. The spring pocket 58*g* is a recess for the latch return spring 68, which is coupled to the latch 58 and to the housing 56. For example, one end of the latch return spring 68 may be coupled to the latch 58 within the spring pocket 58*g*, for example via another anchor 66*o*, and another end may be coupled to the anchor 66*m* of the housing 56. Also, a magnet pocket 58*h* holds a magnet 70 to keep the latch 58 closed so a weapon does not fall out once the electromechanical slide bolt is actuated. The latch 58 may be composed of a polyacetal material, for instance, DELRIN, or any other polymeric or other material suitable for use in contacting and securing weaponry, preferably, a material that won't harm any protective coating on the weaponry.

Figure 11:
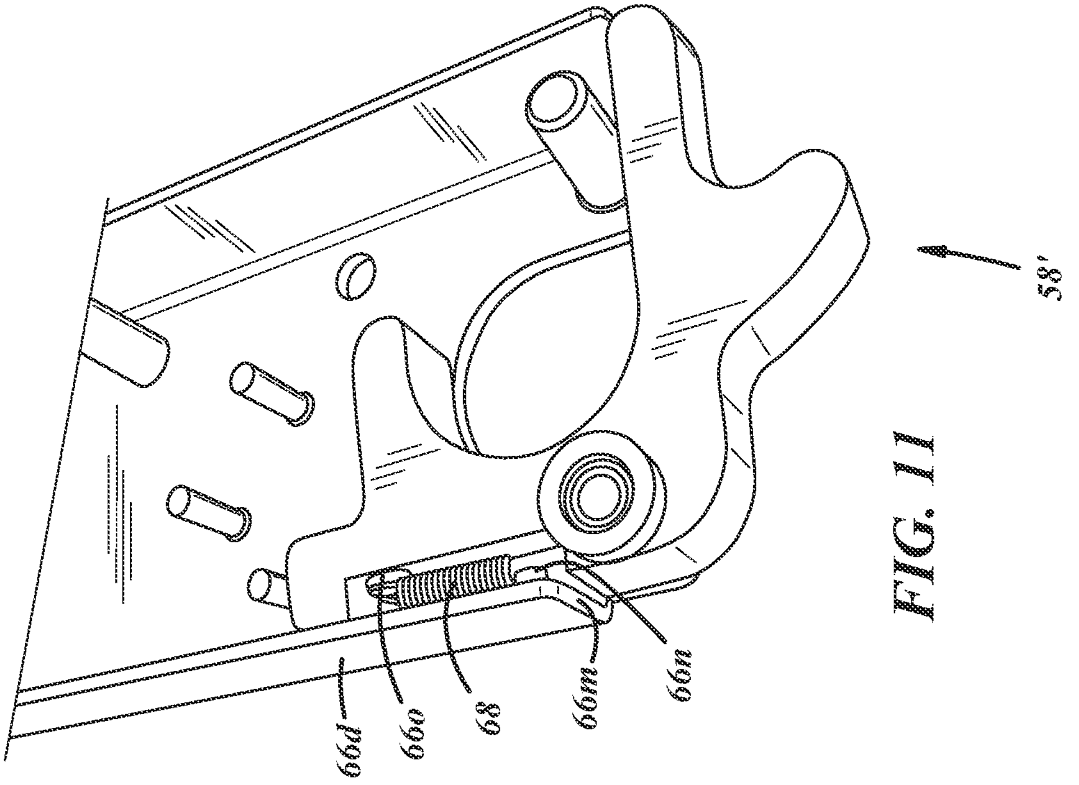
FIG. 11 is a bottom-up perspective view of a portion of the weapon lock of FIG. 6.

With reference to FIG. 11, the spring 68 is a coiled tension spring, but in other embodiments the spring may include a torsional coiled spring disposed about the latch pivot axis and having one end in contact with the housing 56 and another end in contact with the latch 58.

Figure 12:
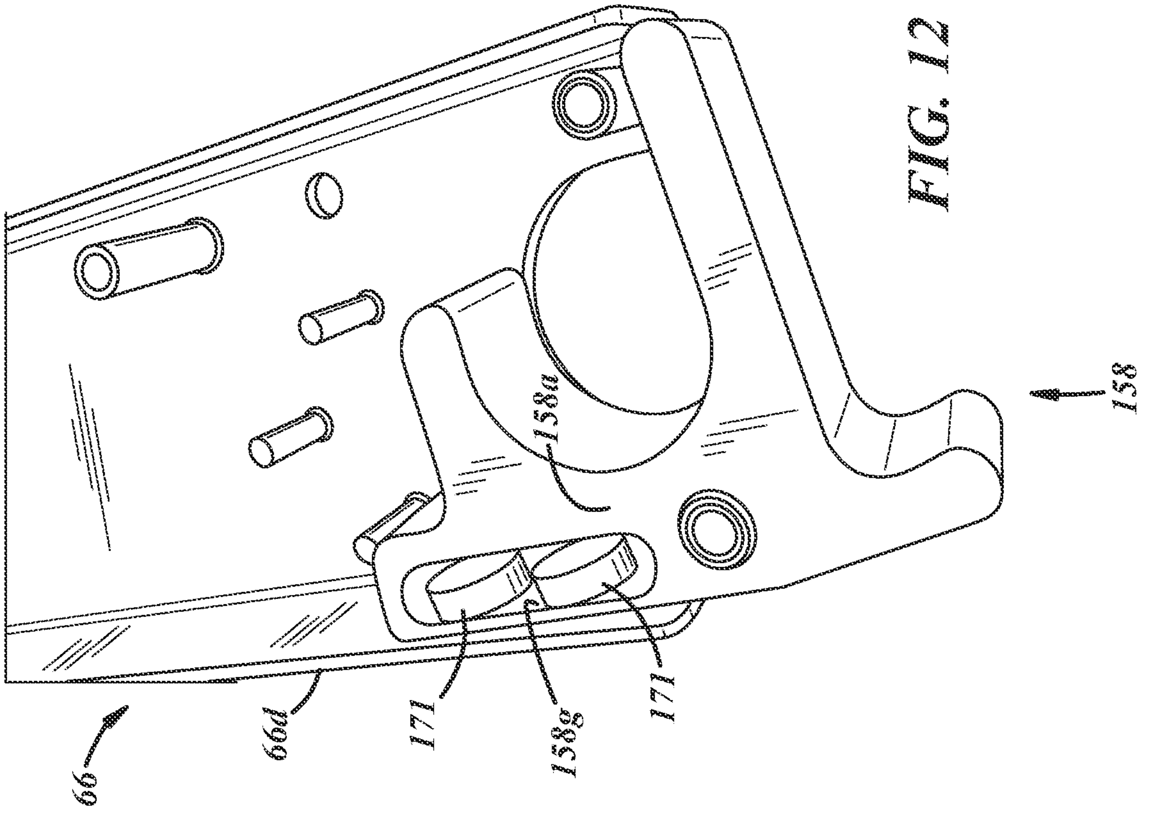
FIG. 12 is a bottom-up perspective view according to another illustrative embodiment of a portion of a weapon lock.

With reference to FIG. 12, in other embodiments, a latch 158 may include one or more magnet pockets 158*g* to carry one or more magnets 171 that are powerful enough to attract the sidewall 66*d* of the housing 56 when the latch 158 is pivoted to a partially closed position. The pocket(s) 158*g* may be provided in an axially end surface of a base wall 158*a* of the latch 158. The pocket(s) 158*g* may be over-coated and/or filled in with an epoxy or any other material suitable for use with magnets.

With reference again to FIG. 10, the weapon lock 40 also includes the electromechanical slide bolt 60 carried by the housing 56 between the walls 64*b*, 66*b* of the housing 56 and configured to cooperate with the latch 58 to lock the latch 58 in the locked position of the latch 58. The electromechanical slide bolt 60 includes a housing 72, a latch bolt 74 slidably carried by the housing 72 to extend outwardly and forwardly with respect thereto and having a cam side 74*a* and a latch side 74*b*, and an actuator (not separately shown) carried in the housing 72 and configured to retract the latch bolt 74 upon activation of the actuator. Also, the slide bolt 60 includes a manual override plunger 76 carried by the housing 72 to extend outwardly and rearwardly with respect thereto and configured to retract the latch bolt 74 upon rearward movement of the plunger 76. The slide bolt 60 may be an EM-05 series slide bolt available from Southco, or any other slide bolt suitable for use with the weapon lock. The slide bolt housing 72 may be coupled to the weapon lock housing 56 via fasteners 73, as illustrated, or in any other suitable manner. The slide bolt 60 may be powered and controlled by a power supply and controller carried by the cabinet housing, or located in a biometrics access kiosk, or the like.

Additionally, the weapon lock 40 may include the manual override lock 62 carried by and fixed to the housing 56 and operatively coupled to the manual override plunger 76 directly, or indirectly via any suitable linkage 78. The manual override lock 62 may include upper and lower portions carried in the override lock mounting holes 66*l*, 64*l* of the upper cover 66 and the lower base 64, and is configured to retract the plunger 76 upon insertion of a key in the manual override lock 62 and turning of the key. The linkage 78 may include a plate 78*a* having an oblong hole 78*b* at one end for cooperating with a non-circular portion of a rotatable shaft of the override lock 62 and a pin 78*c* extending away from another end of the plate 78*a* for cooperating with a corresponding hole 76*a* in the manual override plunger 76.

Furthermore, the weapon lock 40 may include a light 80, for example, an LED, to indicate that the lock 40 is being opened and/or is currently open, and/or to indicate that the lock 40 is closed. Likewise, the cabinet may include a light (not shown), for example, an LED, to indicate that the doors are being opened or are currently open and/or unlocked. Additionally, the cabinet may include an RFID reader inside the cabinet to poll and read RFID-integrated weaponry or other equipment stored in the cabinet. Likewise, the RFID reader and the weapon locks may be in wired or wireless communication with the assignee-proprietary BACS equipment disclosed in U.S. Pat. No. 9,355,510. Such lights may be powered and controlled by a power supply and controller carried by the enclosure, or located in a biometrics access kiosk, or the like.

Figure 13:
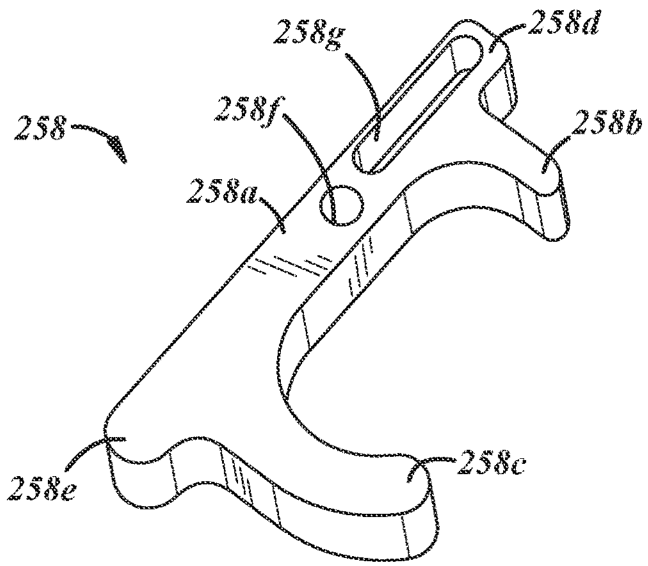
FIG. 13 is a perspective view of an illustrative embodiment of another latch that may be used with the weapon lock of FIG. 6.

With reference to FIG. 13, another illustrative embodiment of a latch 258 may be used with the lock 40 described above. This latch 258 may have a larger pocket between a base wall 258*a* and receiver and retainer arms 258*b,c* to accommodate a larger gun barrel, for example, for a shotgun. The latch 258 may include a pivot limit extension 258*d*, a finger extension 258*e*, a pivot axis passage 258*f*, and a magnet pocket 258*g*.

Figure 14:
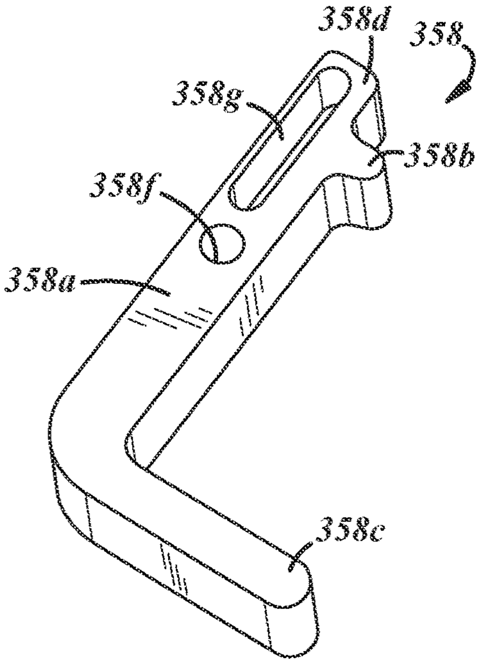
FIG. 14 is a perspective view of another illustrative embodiment of an additional latch that may be used with the weapon lock of FIG. 6.

With reference to FIG. 14, another illustrative embodiment of a latch 358 may be used with the lock 40 described above. This latch 358 may be L-shaped and have an even larger pocket between a base wall 358*a* and receiver and retainer arms 358*b,c* to accommodate a hand grip of a handgun. The latch 358 may include a pivot limit extension 358*d*, a finger extension 358*e*, a pivot axis passage 358*f*, and a magnet pocket 358*g*.

Figure 15:
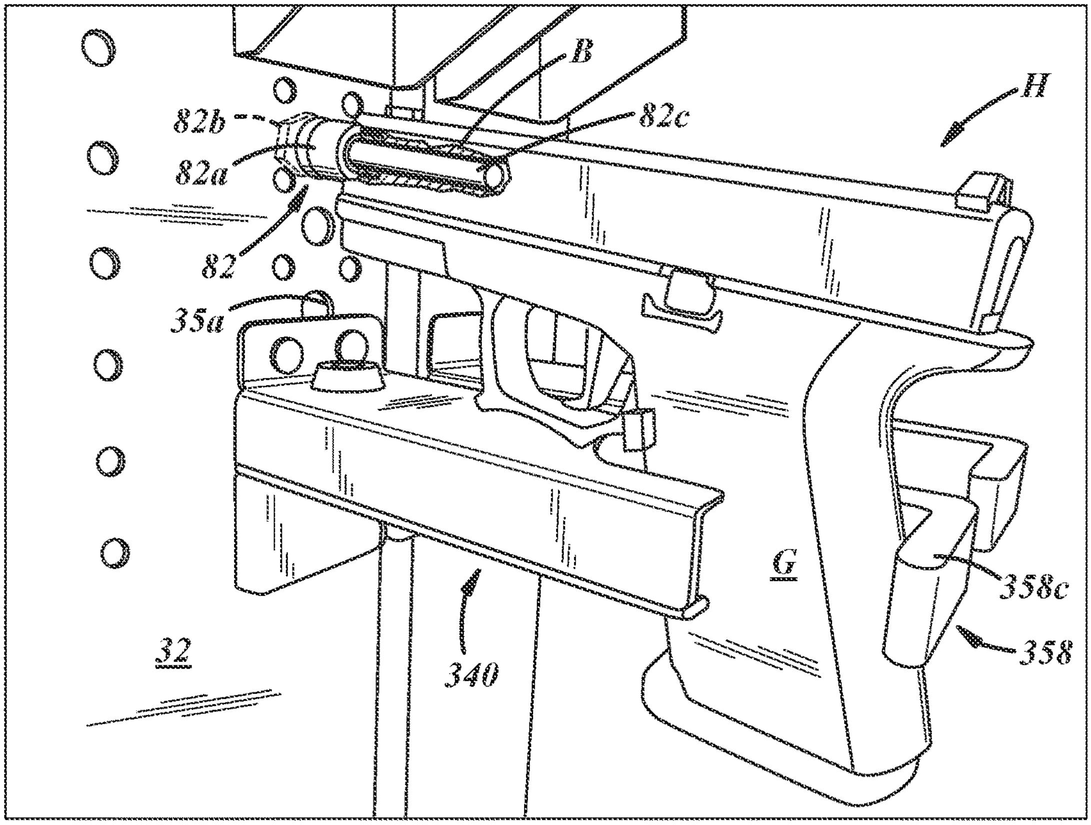
FIG. 15 is a perspective view according to another illustrative embodiment of a weapon lock adapted for use with a handgun and including the latch of FIG. 14.

FIG. 15 shows an additional illustrative embodiment of an electromechanical weapon lock 340, and a handgun restraint 82 carried by the mounting backplane 32. The handgun restraint 82 is configured to restrain a portion of a handgun H, and the retainer arm 358*c* of the latch 358 is configured to hook behind a grip G of the handgun H to lock the handgun H. More specifically, the handgun restraint 82 may be fastened to the backplane 32 via a threaded stud 82*a* on a front of the backplane 32 and extending through a central aperture 35*a* and coupled to a threaded nut 82*b* at a rear of the backplane 32, or in any other suitable manner. And the handgun restraint 82 includes a post 82*c* that extends away from the backplane 32 and is configured to extend into a barrel B of the handgun H.

Although not illustrated, in another embodiment, a handgun restraint may include a rod having a fixed end configured to be fixed to the weapon lock housing and a free end configured to enter the barrel B of the handgun H. In that case, the rod also includes an upright portion including the fixed end, a transversely extending portion, and a longitudinally extending portion including the free end. The fixed end may include a locating flange and a threaded portion on one side of the flange.

Likewise, although not illustrated, in another embodiment, a handgun restraint may be carried by the weapon lock housing and may include a holster including a lock channel portion configured to slide over the housing, and a handgun channel configured to receive a portion of the handgun therein, for instance one or more portions of barrel, a slide assembly, or a frame. The lock channel portion includes a lower wall, housing sidewalls extending away from the lower wall, an intermediate wall extending laterally inwardly from the housing sidewalls, gun barrel sidewalls extending away from the intermediate wall, and an upper wall extending laterally inwardly from the gun barrel sidewalls. The lower wall may be constituted from two laterally opposed and spaced apart flanges. One or both of the flanges may include a fastener hole therethrough to accept a fastener used to fasten the holster to the housing. The intermediate wall also may be constituted from two laterally opposed and spaced apart flanges. The upper wall also may include a longitudinally extending rib, which may be used as a guide for the weapon and/or an accessory (e.g. sight) of the weapon, and/or may provide clearance for front sights on a handgun.

In use, and with reference to FIG. 1, to obtain access to the cabinet 10, a user may interact with a biometrics access system (not shown) in communication with the enclosure lock 22 and the weapon locks 40 (FIG. 2). Once the biometrics access system recognizes the user as being pre-authorized for access to the cabinet 10, the system can send an enclosure open signal to the enclosure lock 22 to allow it to be opened, whereby the user can grasp and rotate the handle of the enclosure lock 22 to open the doors 20, 21. Also, with reference to FIG. 2, the biometrics access system can send a weapon lock open signal to open one or more of the weapon locks 40. Upon receipt of the weapon lock open signal, the electromechanical slide bolt 60 (FIG. 10) of the weapon lock 40 is actuated to allow the latch 58 to be rotated to its open position to release a gun barrel from the rest of the weapon lock 40. But the magnet 70 (FIG. 10) holds the latch 58 in its closed/locked position until a user pulls the weapon away from the housing 56 so as to rotate the latch 58 to its open position. Accordingly, the magnet 70 (FIG. 10) prevents the weapon from falling out of the weapon lock 40 when the latch open signal is received. When the user wishes to return the gun to a locked state, the user pushes the gun barrel against the latch 58 and rotates the latch 58 into its locked position wherein the spring 68 (FIG. 10) and/or the magnet(s) 70 (FIG. 10), 171 (FIG. 12) pull the latch 58 toward the closed/locked position, a portion of the latch 58 snaps past the bolt 74 (FIG. 10) of the electromechanical slide bolt 60 (FIG. 10) into a locked position, and the latch magnet(s) 70 (FIG. 10), 171 (FIG. 12) magnetically hold the latch 58 with respect to the housing 56.

With continued reference to FIG. 2, the stock boots 38 and the weapon locks 40 may be adjusted to hundreds of different discrete positions to accommodate nearly every length and type of long gun, from shorter automatic assault rifles to longer sniper rifles and shotguns therebetween. Also, because each weapon lock 40 can be adjusted downwardly as far as the particular gun barrel allows, the stock boot 38 and corresponding weapon lock 40 can help prevent in-place disassembly of certain weapons. Accordingly, the rack 30 need not include breech clamps to retain weapons. Moreover, the weapon locks 40 and stock boots 38 are adjustable to allow weapons mounted with bulky optics and/or other accessories to be staggered to facilitate more efficient and higher storage density. Once the weapon locks 40 are coupled to a power supply and controller, one or more of the locks 40 can be automatically actuated to unlock one or more of the guns. And the guns can be returned easily by grasping mid-portions of the guns, locating the stocks in respective boots 38, pivoting the guns toward the backplane 32 until the gun barrels locate against the latches 38, and pushing the latches 38 into their locked positions. Furthermore, the weapon locks 40 may double as both long gun barrel locks and handgun locks.

As used in this patent application, the terminology "for example," "for instance," "like," "such as," "comprising," "having," "including," and the like, when used with a listing of one or more elements, is open-ended, meaning that the listing does not exclude additional elements. Likewise, when preceding an element, the articles "a," "an," "the," and "said" mean that there are one or more of the elements. Moreover, directional words such as front, rear, top, bottom, upper, lower, radial, circumferential, axial, lateral, longitudinal, vertical, horizontal, transverse, and/or the like are employed by way of example and not limitation. As used herein, the term "may" is an expedient merely to indicate optionality, for instance, of an element, feature, or other thing, and cannot be reasonably construed as rendering indefinite any disclosure herein. Other terms are to be interpreted and construed in the broadest reasonable manner in accordance with their ordinary and customary meaning in the art, unless the terms are used in a context that requires a different interpretation.

Finally, the present disclosure is not a definitive presentation of an invention claimed in this patent application, but is merely a presentation of examples of illustrative embodiments of the claimed invention. More specifically, the present disclosure sets forth one or more examples that are not limitations on the scope of the claimed invention or on terminology used in the accompanying claims, except where terminology is expressly defined herein. And although the present disclosure sets forth a limited number of examples, many other examples may exist now or are yet to be discovered and, thus, it is neither intended nor possible to disclose all possible manifestations of the claimed invention. In fact, various equivalents will become apparent to artisans of ordinary skill in view of the present disclosure and will fall within the spirit and broad scope of the accompanying claims. Features of various implementing embodiments may be combined to form further embodiments of the invention. Therefore, the claimed invention is not limited to the particular examples of illustrative embodiments disclosed herein but, instead, is defined by the accompanying claims.

The invention claimed is:

1. An electromechanical weapon lock, comprising:

a housing, including a rear wall, upper and lower walls extending in a forward direction away from the rear wall, wherein the upper and lower walls include front portions having scallops to partially establish a weapon pocket and projections on either side of the scallops, and sidewalls extending in a forward direction away from the rear wall and between the upper and lower walls; and a latch pivotably coupled to the housing about a latch pivot axis, and including a base arm extending along a base arm axis, a receiver arm extending transversely away from the base arm and configured to cooperate with the base arm to receive a gun barrel when advanced against the weapon lock, a retainer arm extending transversely away from the base arm to partially establish the weapon pocket and configured to retain the gun barrel against withdrawal when the latch is in a locked position, and a pivot limit extension extending longitudinally away from the base arm to limit pivoting of the latch beyond a desired gun barrel receiving position of the latch.

2. The lock of claim 1, further comprising:

a spring to bias the latch to the locked position of the latch.

3. The lock of claim 2, wherein the spring is a coiled tension spring coupled to the latch within a spring recess of the base arm of the latch and coupled to one of the sidewalls of the housing.

4. The lock of claim 1, further comprising:

one or more magnets to bias the latch to the locked position of the latch.

5. The lock of claim 1, wherein the latch further includes a finger extension extending away from a junction of the base and retention arms and configured to aid a user in moving the latch to the locked position.

6. The lock of claim 1, further comprising:

an electromechanical slide bolt carried by the housing between the sidewalls of the housing and configured to cooperate with the latch to lock the latch in the locked position of the latch, and including a housing, a bolt slidably carried by the housing to extend outwardly and forwardly with respect thereto and having a cam side and a latch side, an actuator carried in the housing and configured to retract the bolt upon activation of the actuator, and a manual override plunger carried by the housing to extend outwardly and rearwardly with respect thereto and configured to retract the bolt upon rearward movement of the plunger.

7. The lock of claim 6, further comprising:

a manual override lock carried by the housing and coupled to the manual override plunger via a linkage to retract the plunger upon insertion of a key in the lock and turning of the key.

8. The lock of claim 1, wherein the housing includes a lower base and an upper cover, wherein the lower base includes a lower rear flange and a lower wall extending forward from the lower rear flange, and wherein the upper cover includes an upper rear flange, an upper wall extending forward from the upper rear flange, and the sidewalls depending downwardly from laterally opposite sides of the upper wall, wherein the upper and lower rear flanges of the upper cover and the lower base constitute the rear wall of the housing.

9. The lock of claim 8, wherein the lower wall includes a lower scalloped front end including a lower scallop of the scallops to partially establish the weapon pocket and lower projections of the projections on either side of the lower scallop of the scallops to provide support for a latch pivot and a latch stop, and wherein the upper wall includes an upper scalloped front end including an upper scallop of the scallops to partially establish the weapon pocket and upper projections of the projections on either side of the upper scallop of the scallops to provide support for the latch pivot and the latch stop.

10. The lock of claim 1, further comprising a magnet carried between the latch and the housing to maintain the latch in a desired position.

11. The lock of claim 10, wherein the magnet is carried in a pocket in the base arm of the latch.

12. The lock of claim 1, wherein the base arm of the latch includes a spring pocket.

13. A gun rack, comprising:

a mounting backplane having two different aperture arrays including a lower aperture array having multiple columns and rows of mounting aperture patterns each including side-by-side pairs of mounting apertures, and an upper aperture array having multiple columns and rows of mounting and access aperture patterns each including a central access aperture and at least two mounting apertures;

a plurality gun stock boots coupled to the lower aperture array; and a plurality of the electromechanical weapon lock set forth in claim 1 coupled to the upper aperture array.

14. The gun rack set forth in claim 13, further comprising:

a handgun restraint coupled to the mounting backplane above one of the plurality of the electromechanical weapon lock and configured to extend into a barrel of a handgun.

15. A gun cabinet, comprising:

the gun rack set forth in claim 13;

sidewalls extending forward away from a base wall, top and bottom walls extending forward away from a rear wall, and doors hingedly coupled to the sidewalls, wherein the sidewalls and doors have arrays of apertures at upper portions thereof to permit visibility into an interior of the cabinet when the doors are closed.

* * * * *